United States Patent [19]

Johnson

[11] Patent Number: 5,254,834
[45] Date of Patent: Oct. 19, 1993

[54] METHOD OF FORMING CLOSELY-SPACED, GENERALLY PARALLEL SLOTS THROUGH A THIN WALL AND PRODUCT FORMED THEREBY

[75] Inventor: David A. Johnson, St. Louis Park, Minn.

[73] Assignee: JohnsTech International Corporation, Minneapolis, Minn.

[21] Appl. No.: 892,233

[22] Filed: Jun. 2, 1992

[51] Int. Cl.$^5$ .............................................. B23K 26/00
[52] U.S. Cl. ........................ 219/121.72; 219/121.84
[58] Field of Search .................... 219/121.67, 121.72, 219/121.81, 21.84

[56] References Cited

U.S. PATENT DOCUMENTS 4,343,358  8/1982  Gryskiewicz ............. 219/121.71 X
5,059,256  10/1991  Kanapenas et al. ........ 219/121.67 X Primary Examiner—C. L. Albritton
Attorney, Agent, or Firm—Lawrence M. Nawrocki

[57] ABSTRACT

A method of manufacturing an electrical connector housing for mounting a plurality of connector elements. Such a housing mounts elements to be engaged by corresponding contacts of an integrated circuit device which are disposed in an array. The method includes the steps of providing a block made of an appropriate material such as a polyamide. The block provided has a relatively thin wall which is defined by two oppositely facing surfaces. Typically, the thickness of the wall is less than about 0.15 inches. A trough, generally conforming in size and shape to the size and shape of the contact array of the integrated circuit, is formed in at least one of the two oppositely facing, spaced surfaces defining the wall. Such a trough is intended to receive a connector element support. In manufacturing the housing for mounting the connector elements, each trough is filled with a rod, generally conforming in cross-section to a cross-section of the trough. The rod can, it is envisioned, be made of the same material of which the block is made. With the rod or rods received within their corresponding troughs, a plurality of generally parallel slots are laser machined in the block. The slots are positioned to intersect, and be closely spaced along, each trough.

23 Claims, 1 Drawing Sheet

5,254,834

METHOD OF FORMING CLOSELY-SPACED, GENERALLY PARALLEL SLOTS THROUGH A THIN WALL AND PRODUCT FORMED THEREBY

TECHNICAL FIELD

The present invention deals broadly with the field of machining through relatively thin walls of components. More narrowly, however, it is directed, in one specific application, to machining and manufacturing a housing for mounting a plurality of connector elements which are to be engaged by corresponding contacts of, for example, an integrated circuit, which are disposed in an array. The focus of the invention is a method of manufacturing such a product wherein a plurality of generally parallel slots are formed through the wall, each slot being intended to receive one connector element.

BACKGROUND OF THE INVENTION

Various applications exist wherein closely-spaced slots are to be defined through a relatively thin wall in the manufacture of a particular product. One specific example of an application is a connector housing for mounting a plurality of connector elements used in integrated circuit testing. The electrical connector elements are, typically, generally planar in configuration and are mounted in substantially parallel slots for rotation about an axis generally perpendicular to planes defined by the elements. The rotation is effected as contacts of the integrated circuit engage the connector elements, and a "wiping" action is thereby effected so that, at the interface between a connector element and a contact of the integrated circuit, a good electrical transmission path is established.

The spacing of the connector elements is, of course, dictated by the spacing of the contacts on the integrated circuit to be tested. Very frequently, the spacing is quite close. It is necessary, therefore, to provide slots in the housing mounting the electrical connectors which are spaced at the appropriate distances in view of the contact spacing on the IC.

The housing for mounting the connector elements, as will be able to be seen then in view of the disclosure to this point, provides an array of alternating slots and ribs. Typically, in view of the close spacing of the contacts on the IC, the ribs are very narrow. They are often only on the order of a range between 0.005 to 0.035 inches in thickness. In many cases they are less than 0.025 inches thick.

The problems in manufacturing a housing as discussed hereinbefore are complicated by the manner in which the connector elements are mounted in the housing. U.S. Pat. No. 5,069,269, which issued to the present Applicant on Dec. 3, 1991, illustrates elongated tubular elements, which can be either elastomeric or rigid in nature, which are received in troughs formed in oppositely facing surfaces of the generally thin wall of the housing. The connector elements illustrated in that patent are, in turn, hooked to the tubular members to accomplish mounting. It will be seen then that it is frequently necessary to provide a trough or troughs which run across the array of slots in which the connector elements are disposed.

The prior art has sought to provide appropriate manufacturing processes for a housing for mounting the electrical connector elements. A first proposed solution has been to form the housing employing an injection molding process. This has been the standard method for producing a low cost housing component for test sockets for semiconductor devices. Injection molding does, however, have economic, technical, and leadtime drawbacks. Tooling and developing costs incident to the injection molding of a housing can run as high as $90,000 dollars. The specific costs, of course, depend upon a number of factors including the number of connector elements to be provided for mounting. From a technical perspective, however, injection molding almost becomes precluded in view of the minute dimensions typically involved. In view of the very thin width dimension of ribs between connector element mounting slots (typically less than 0.025 inches), the material used for molding and the pressures required to inject the material make it virtually impossible to provide an acceptable product using this method.

Such a housing requires close tolerances. In the case of injection molding, dimensional accuracy is sacrificed. The material injected has some measure of shrinkage associated with the injection molding process, and such shrinkage becomes clearly evident after the housing is cured.

The second manufacturing possibility is water-jet cutting. Such a method, however, typically, produces a poor slot cut along the full length of each slot. Problems are typically encountered with the initial penetration of the water-beam. The initial penetration typically causes an enlarged hole. Further, however, the housing material, in the case of water-jet cutting, chips and fractures.

Another proposed solution is tool machining. Such a possibility is, however, unacceptable for a number of reasons. A housing takes too long to manufacture, and the probability of tool bits breaking is high. Even when bits do not break, the ribs defining the slots in the housing can deform during the manufacturing process. Such deformation occurs because of tool pressure causing the ribs to deflect.

Another potential solution to the manufacture of such a product is laser machining. Laser machining of plastics has been performed in numerous applications for a number of years. Limited success has been achieved with respect to high-temperature engineering plastics.

One of the major drawbacks to laser cutting of any engineering plastic is that a char residue can remain on the surface of the material that has been machined. Such a residue is, on occasion, electrically conductive. This is particularly unacceptable in the case of the manufacture of an electrical connector housing.

Other questions have remained with regard to utilization of laser machining such components. Should the connector element slots be formed first and then troughs for receiving tubular mounting members formed thereafter? It has been found that, by doing so, the slots tend to have rolled edges and machine burrs which are almost impossible to remove.

It is to these dictates and problems of the prior art that the present invention is directed. It is an improved method for manufacturing a product such as an electrical connector housing for mounting a plurality of connector elements.

SUMMARY OF THE INVENTION

The present invention is a method of manufacturing a product in which a plurality of closely-spaced, generally-parallel slots are to be formed through, or partially through, a thin wall of a block, typically, of a plastic material. The method includes a step of filling one or more troughs formed in one or both of oppositely facing surfaces of the wall with a filler material to form a rod. Such a rod conforms in cross-section, generally, to a cross-section of the trough. With the rod or rods received within the trough or troughs, a plurality of generally parallel slots are laser machined through the wall of the block across the filled trough or troughs. When such troughs are present, the slots are machined so as to intersect one or more corresponding troughs. After the slots are laser machined through the wall, the disc-like residual rod portions are removed from the troughs. In a preferred embodiment of the process, a block made of a polyamide-imide material is provided to be machined. It is envisioned that a thickness of the wall through which the slots are to be machined would be less than about 0.15 inches. In this application, one or more troughs would be provided in at least one of the oppositely facing surfaces of the wall.

In this embodiment, after machining of the slots has been accomplished and disc-like residual rod portions in the troughs have been removed, the component thereby manufactured is cleaned. Cleaning can be accomplished by directing a stream of glass particles from a small tip opening nozzle into the slots. Concurrently, a dry gas can be directed into the slots to reduce moisture and, thereby, the possibility that the glass particles will clog up the slots. By utilizing such steps, the slots can be abrasively cleaned of a black char deposit which is typically left after the laser machining step is performed.

The slotting process, typically, takes a number of pulses to completely form the slot. The laser pulse, in the case of most laser machining implements, produces a small diameter hole. Typically, the hole is on the order of between 0.003 to 0.007 inches in diameter. Frequently, it is necessary to induce two pulses, at least in forming the first hole, to completely burn through the thickness of the wall when the wall is, for example, 0.090 inches thick. One pulse might, of course, be sufficient with thinner walls.

Pulsing of the laser at different locations is thereby sequentially accomplished to fully define the slot. Overlapping holes are formed to extend the length of the slot. Holes which overlap on the order of 0.001 inches to 0.002 inches have been found to be appropriate when the laser beam diameter is between 0.005 inches and 0.007 inches. With such a beam diameter, any smaller overlap would result in "scalloping". If the overlapping were any greater, an excessive amount of heat would be allowed to build up in the material, and warping of the ribs between the slots could result.

The present invention is thus an improved method for manufacturing a structure as discussed. More specific features and advantages obtained in view of those features will become apparent with reference to the DETAILED DESCRIPTION OF THE INVENTION, appended claims, and accompanying drawing figures.

DETAILED DESCRIPTION OF THE INVENTION

Figure 1:
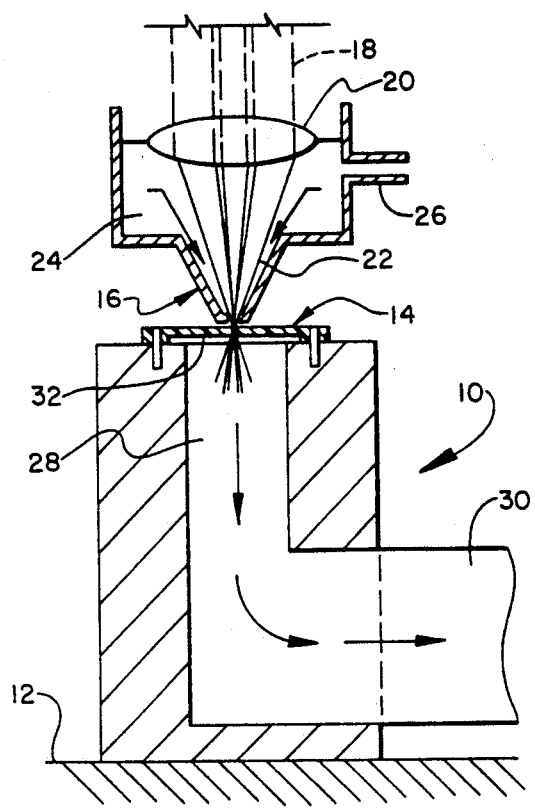
FIG. 1 is a simplified mechanical diagram of a structure used in accordance with the present method invention with projection lines and arrows added for descriptive purposes.
Figure 2:
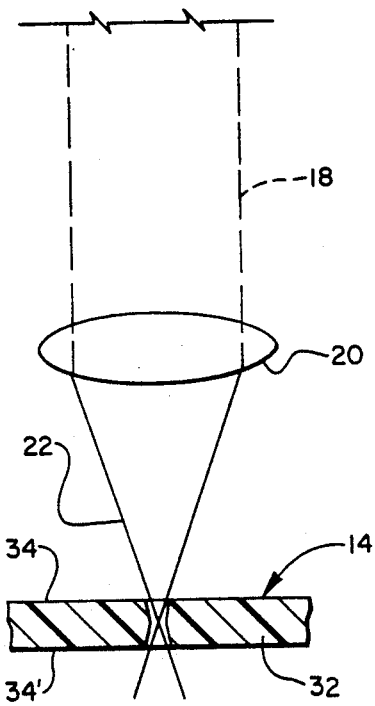
FIG. 2 is an enlarged simplified mechanical diagram of the structure shown in FIG. 1.

Referring now to the drawing wherein like reference numerals denote like elements throughout the several views, FIG. 1 illustrates, in a simplified presentation, an alignment fixture 10 which is mounted to an X-Y coordinate table 12. The alignment fixture 10 can be disposed so that it is moved, as dictated by computer programming, such that, for example, a test socket housing 14 secured on the fixture 10 is moved relative to a fixed laser head 16.

A laser beam 18 is generated at a source (not shown) and is focused by a lens 20 to a concentrated beam as at 22. The lens 20 is mounted within a chamber 24 closely proximate the test socket housing 14 to be machined.

An inert gas (for example, $N_2$) can be introduced into the chamber 24 through a fitting 26. The gas can function to purge the chamber 24 so as to reduce the possibility of soot accumulating on the lens 20. Additionally, this process helps urge soot and debris from the laser cutting evolution downwardly through a passage 28 in the alignment fixture 10 into a vacuum chamber 30. A vacuum is applied through the alignment fixture 10 to pull smoke and debris from the area of the component being machined.

The description to this point is of structure old in the art. Laser equipments for machining components, including plastic components, are known. Using such equipment to machine plastics has been done for a number of years, although such processes have met with only limited success particularly with respect to high-temperature engineering plastics.

The workpiece 14 shown in the figures as being mounted to the alignment fixture 10 is a block intended to eventually function as the housing for a test socket. Various materials have been used for such housings in the prior art. Once such material is an acetal material marketed under the name DELRIN ®. This material has been found, however, to be not particularly appropriate for use in the present process invention.

A material that is particularly appropriate is a polyamide-imide material. One material of this nature which serves particularly well is marketed under the name TORLON ®. This specific material is produced by Amoco Torlon Products Division of Amoco Chemical Corporation. This specific material has been found to have particularly good characteristics for being processed in a manner as will be discussed hereinafter, and this is particularly true when the material is glass-filled from between 10%-40%. Thinner ribs between slots machined can be cut, and a cleaner cut surface can be maintained.

An acceptable alternative material for use in this process is one characterized as a polyether-imide resin. A specific material within this alternative category is one marketed under the name ULTEM ®. This specific material is sold by General Electric. Again, 10%-40% glass filling enhances the material's characteristics.

As seen in FIGS. 1-6, the test socket housing block 14 is provided with a relatively thin wall 32 defined by two oppositely facing surfaces 34, 34'. The surfaces 34, 34' are spaced from one another, typically, at a distance so that the thickness of the wall 32 if about less than about 0.15 inches. In some applications, the thickness of the wall 32 could be even less than about 0.10 inches. The thickness of the wall 32 selected will, of course, depend upon a number of factors. Among these are the size of connector elements (not shown) intended to be mounted in the test socket housing 14.

Typically, when the wall 32 is on the order of 0.15 inches in thickness, it will take two pulses of the laser, at least initially, at the same location to provide an aperture which extends fully through the thickness of the wall 32. On the other hand, however, when the wall 32 is 0.10 inches or less in thickness, a single laser pulse may be sufficient to cut through the full thickness of the wall 32.

Figure 4:
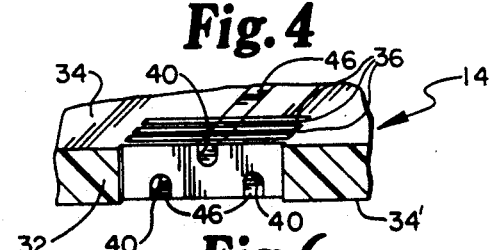
FIG. 4 is a fragmentary pictorial view of the workpiece of FIG. 3 after slots have been laser machined into the workpiece.
Figure 5:
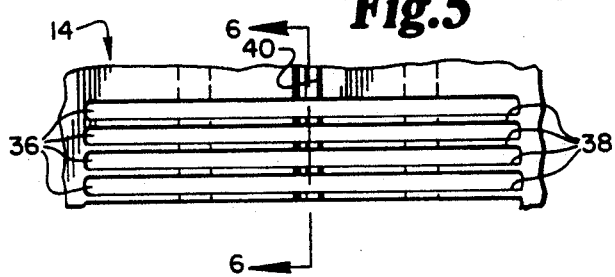
FIG. 5 is a fragmentary top plan view of the workpiece with filler material removed from troughs.
Figure 6:
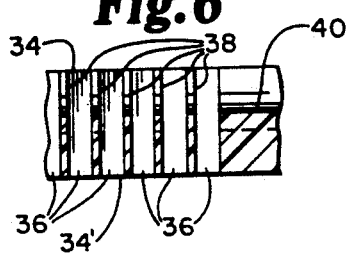
FIG. 6 is a sectional view taken generally along line 6—6 of FIG. 5.

It will be understood that slots to be cut, as illustrated in FIGS. 4-6, will be formed by cutting multiple, adjacent apertures through the thickness of the wall 32. Again, the alignment fixture 10 can be programmed so as to move in accordance with computer software instructions to effect the cutting of a slot or slots 36 of the appropriate length and width. To do this, a series of aligned, overlapping apertures would be cut through the wall 32, and, if the application dictated the need for wider slots 36, multiple rows formed by cutting aligned, overlapping apertures could be effected.

In order to fully define the slot 36, the laser head 16 will be pulsed at different locations in a sequential manner. Holes which are overlapped are formed to extend the length of the slot 36. Holes which overlap on the order of 0.001 inches to 0.002 inches have been found to be appropriate when the laser beam 22 diameter is, for example, between 0.005 inches and 0.007 inches. Such a degree of overlapping will be sufficient so as to preclude "scalloping". The overlapping will not be so extensive that an excessive amount of heat builds up in the material. If such a situation were allowed to occur, the ribs 38 between which the slots 36 were to be defined could become warped.

Figure 3:
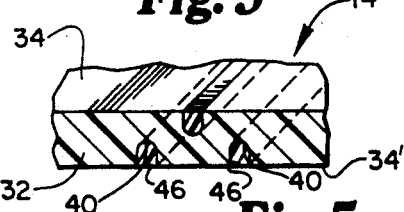
FIG. 3 is a fragmentary pictorial view of a preprocessed workpiece.

It will be understood, however, that, prior to machining the slots 36 as discussed to this point with a laser implement, one or more troughs 40 could be formed in each of the two oppositely facing surfaces 34, 34' defining the wall 32 in the housing block 14. These troughs 40 are best seen in FIGS. 3 and 4, and each trough 40 is intended to receive, when the workpiece being processed is intended to serve as a test socket housing, a support by which one or more connector elements are mounted within the housing 14.

The supports (not shown) are intended to be generally tubular, and the troughs 40 are shown as being defined by a pair of generally parallel walls 42 merging, at the bottom of the particular trough, with opposite edges of a generally semicylindrical portion 44 of the trough 40. A support can, thereby, be easily slipped into its respective trough 40, the diameter of the support being substantially the same as the distance between the generally parallel walls 42 defining, in part, the trough 40.

Prior to the performance of the laser machining operation, a filler material such as a paste can be inserted into trough 40 across which slots 36 are to be cut. When the material dries, it forms a rod 46. By providing such a rod 46, the slot 36 machining process is more efficiently accomplished. Because of the thinness of ribs 38 defining the slots 36 which are cut, it has been discovered that, absent the employment of such rods 46, the ribs 38 can become deformed or broken during laser cutting. The rod 46 provided in a particular trough 40 is provided with a cross-section which substantially conforms to the cross-section of the trough 40. This is best seen in FIGS. 3 and 4. It is intended that the rods 46 be made of the same material of which the block 14 is formed or a material of similar laser cutting characteristics. That is, if the block is made of a polyamide-imide material, the rods 46 received in its troughs 40 would also be made of a polyamide-imide material. If, on the other hand, the block 14 were made of a polyether-imide resin material, the rods 46 would be made of that material also.

It has been found that, regardless of what material the block 14 is made, the rods could also be made of polytetrafluoroethylene. It has been found that this material serves well to inhibit chipping, breaking, and deforming of the ribs 38 defining the slots 36. All that is necessary when PTFE is used to form the rods 46 is that the rods 46, in cross-section, conform to the cross-section of the troughs 40 in which they are to be received.

As the slots 36 are cut across a trough or troughs 40, portions of the rod 46 will be cut along with portions of the block 14 in which the slots 36 are cut. Portions of the rods 46, however, will remain in trough sections where slots 36 have not been cut intersecting the troughs 40. Upon completion of the laser machining of the slots 36, the segments of the rods 46 will be removed.

Once the slotted housing 14 is completed and after the rod segments have been removed from the trough 40, the housing 14 can be cleaned. The present invention contemplates cleaning the housing 14 by directing a pressurized stream of glass particles from a nozzle into the slots 36. It has been found that performing this step serves to efficiently clean a black char deposit that might be left on the surface of the housing 14 as a result of the laser machining. As previously discussed in this document, such deposits tend to be electrically-conductive, and, in certain applications, the permitting of such a residue to remain would be totally unacceptable.

One potential problem which the invention intends to obviate is the building up of the glass particles within the narrow slots 36. This can occur if there is moisture either ambiently present within the slots 36 or introduced into the slots 36 during the abrasive cleaning step performance. In order to overcome this potential problem, a dry gas, free of moisture, can be introduced into the slots 36 concurrently with the directing of the glass particles into the slots 36. A gas such as $N_2$ has been found to be appropriate for this purpose.

As previously discussed, the width and spacing of slots 36 will, of course, depend upon the size of the connector elements to be mounted in the housing 14. Typically, a slot 36 would be less than 0.015 inches in width. On occasion, it can have a width of even less than 0.005 inches.

When slots 36 having such dimensions are formed in housing 14, ribs 38 can tend to have a thickness of less than 0.035 inches. This is, of course, a function of the contact spacing on the intregrated circuit. In some applications, the rib thickness can even be as small as 0.005 inches. Typically, it is less than 0.025 inches.

It has been found that a test socket housing 14 manufactured using the materials specified above, employing the methods discussed, and constructing and sizing the components as indicated provides for a housing 14 which performs optimally. The characteristics of such a test circuit housing 14 enable maximization of performance under the conditions in which it is intended to operate.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method of forming a plurality of closely-spaced, generally-parallel slots through a thin wall, wherein the slots are intended to intersect at least one trough formed in one of two oppositely facing surfaces defining the wall, comprising the steps of:
    (a) filling the trough with a filler material to form a rod, generally conforming in cross-section to a cross-section of the trough;
    (b) laser machining, through the wall, a plurality of slots intersecting the filled trough; and
    (c) removing portions of said rod from the trough.

2. The method in accordance with claim 1 further comprising a step of cleaning any residual deposits left from the laser machining step.

3. The method in accordance with claim 2 wherein said cleaning step comprises directing a pressurized stream of glass particles from a nozzle into said slots.

4. The method in accordance with claim 3 further comprising a step of injecting a dry gas into said slots to prevent a building up of the glass particles therein.

5. Apparatus made in accordance with the method of claim 1.

6. A method of manufacturing an electrical connector housing for mounting a plurality of connector elements to be engaged by a corresponding plurality of contacts disposed in an array, comprising the steps of:
    (a) providing a block made of a polyamide-imide material, said block having two oppositely facing surfaces spaced from one another at less than about 0.15 inches;
    (b) forming a trough, generally conforming in size and shape to the size and shape of the contact array, in at least one of said oppositely facing, spaced surfaces to receive a connector element support therein;
    (c) filling said trough with a filler material to form a rod, generally conforming in cross-section to a cross-section of said trough; and
    (d) laser machining in said block a plurality of generally parallel slots which intersect, and are closely spaced along, said filled trough.

7. The method in accordance with claim 6 wherein said rod is made of the same material as that of which said block is made.

8. The method in accordance with claim 6 wherein said rod is made of polytetrafluoroethylene.

9. The method in accordance with claim 6 wherein said two oppositely facing surfaces of said block are spaced from one another at less than about 0.10 inches.

10. The method in accordance with claim 6 wherein said trough is defined by a pair of generally parallel walls merging, at the bottom of said trough, with opposite edges of a generally semicylindrical portion.

11. The method in accordance with claim 6 wherein a rib defined between two adjacent of said slots has a width of between 0 005 inches and 0.035 inches.

12. The method in accordance with claim 11 wherein each of said ribs has a width of between 0.005 inches and 0.025 inches.

13. The method in accordance with claim 6 wherein said laser machining step comprises forming a plurality of overlapping holes, each having a diameter of between 0.002 and 0.008 inches, and wherein one hole overlaps with an adjacent hole between 0.001 and 0.002 inches.

14. The method in accordance with claim 6 further comprising a step of removing portions of said rod from said trough.

15. The method in accordance with claim 14 further comprising a step of cleaning any residual deposits left from the laser machining step.

16. The method in accordance with claim 15 wherein said cleaning step comprises directing a pressurized stream of glass particles from a nozzle into said slots.

17. The method in accordance with claim 16 further comprising a step of injecting a dry gas into said slots to prevent a building up of the glass particles therein.

18. An electrical connector housing made in accordance with the method of claim 6.

19. A method of manufacturing an electrical connector housing for mounting a plurality of connector elements to be engaged by a corresponding plurality of contacts disposed in an array, comprising the steps of:
    (a) providing a block made of a polyether-imide resin material, said block having two oppositely facing surfaces spaced from one another at less than about 0.15 inches;
    (b) forming a trough, generally conforming in size and shape to the size and shape of the contact array, in at least one of said oppositely facing, spaced surfaces to receive a connector element support therein;
    (c) filling said trough with a filler material to form a rod, generally conforming in cross-section to a cross-section of said trough; and
    (d) laser machining in said block a plurality of generally parallel slots which intersect, and are closely spaced along, said filled trough.

20. A method in accordance with claim 19 wherein said laser machining step comprises forming a plurality of overlapping holes, each having a diameter of between 0.002 and 0.008 inches, wherein one hole overlaps with an adjacent hole between 0.001 and 0.002 inches.

21. An electrical connector housing made in accordance with the method of claim 19.

22. A method of forming a plurality of closely-spaced, generally parallel slots in a thin wall, comprising the steps of:
    (a) laser machining, in the wall, a plurality of generally-parallel slots; and
    (b) cleaning any residual deposits left from the laser machining step by directing a pressurized stream of glass particles from a nozzle into said slots.

23. Apparatus made in accordance with the method of claim 22.

* * * * *